(12) United States Patent
Kanamori et al.

(10) Patent No.: US 8,400,079 B2
(45) Date of Patent: Mar. 19, 2013

(54) LED DRIVE CIRCUIT, DIMMING DEVICE, LED ILLUMINATION FIXTURE, LED ILLUMINATION DEVICE, AND LED ILLUMINATION SYSTEM

(75) Inventors: Atsushi Kanamori, Osaka (JP); Hirohisa Warita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 305 days.

(21) Appl. No.: 12/987,286

(22) Filed: Jan. 10, 2011

(65) Prior Publication Data

US 2011/0193488 A1    Aug. 11, 2011

(30) Foreign Application Priority Data

Feb. 5, 2010    (JP) ................. 2010-024376

(51) Int. Cl.
*G05F 1/00* (2006.01)
(52) U.S. Cl. ........ 315/307; 315/297; 315/291; 315/194; 315/224; 315/312
(58) Field of Classification Search ............ 315/194, 315/224, 246, 200 R, 291, 294, 295, 297, 315/307, 312, 316, DIG. 4; 362/545, 555, 362/612, 613, 800
See application file for complete search history.

(56) References Cited

U.S. PATENT DOCUMENTS

| | | | |
|---|---|---|---|
| 7,667,408 B2 * | 2/2010 | Melanson et al. | 315/209 R |
| 7,759,881 B1 * | 7/2010 | Melanson | 315/307 |
| 7,852,017 B1 * | 12/2010 | Melanson | 315/291 |
| 8,339,053 B2 * | 12/2012 | Yamasaki et al. | 315/209 R |
| 2008/0258647 A1 | 10/2008 | Scianna | |
| 2009/0102399 A1 | 4/2009 | Kita | |
| 2010/0090618 A1 * | 4/2010 | Veltman | 315/307 |
| 2010/0219764 A1 | 9/2010 | Yamasaki et al. | |
| 2011/0109244 A1 * | 5/2011 | Grajcar | 315/294 |
| 2011/0234115 A1 * | 9/2011 | Shimizu et al. | 315/287 |

FOREIGN PATENT DOCUMENTS

| | | |
|---|---|---|
| JP | 2000-173304 | 6/2000 |
| JP | 2001-215913 A | 8/2001 |
| JP | 2002-231471 A | 8/2002 |
| JP | 2003-151782 | 5/2003 |

(Continued)

OTHER PUBLICATIONS

Product Data Sheet in Japanese of the SSL2101 LED Driver IC Manufactured by NXP Semiconductors and English translation of relevant portions, Rev. 04; Aug. 28, 2009.

*Primary Examiner* — Haiss Philogene
(74) *Attorney, Agent, or Firm* — Birch, Stewart, Kolasch & Birch, LLP

(57) ABSTRACT

An LED drive circuit in which an alternating voltage from a phase control dimmer is input and an LED is driven. The LED drive circuit comprises a phase angle detector for detecting the phase angle at which a phase control element inside the phase control dimmer switches from off to on; a switching power supply for feeding a current to the LED; a switching element connected in series to the LED; and a controller for controlling the switching power supply and the switching element in accordance with the output of the phase angle detector; wherein the controller places the switching element in an always-on state in a case in which the phase angle detected by the phase angle detector is equal to or less than a predetermined value, and the controller pulse-drives the switching element in a case in which the phase angle detected by the phase angle detector is greater than the predetermined value.

22 Claims, 16 Drawing Sheets

FOREIGN PATENT DOCUMENTS

| | | |
|---|---|---|
| JP | 2004-327152 A | 11/2004 |
| JP | 2005-11739 A | 1/2005 |
| JP | 2005-26142 A | 1/2005 |
| JP | 2006-236709 A | 9/2006 |
| JP | 2006-319172 A | 11/2006 |
| JP | 2007-277155 A | 9/2007 |
| JP | 2007-538378 A | 12/2007 |
| JP | 4199567 B2 | 12/2008 |
| JP | 2009-43694 | 2/2009 |
| JP | 2009-104848 A | 5/2009 |
| JP | 2009-123681 A | 6/2009 |
| JP | 2009-238525 A | 10/2009 |
| JP | 2011-003467 A | 1/2011 |
| KR | 10-2006-0098345 A | 9/2006 |
| KR | 2008-0047521 A | 5/2008 |

* cited by examiner

LED DRIVE CIRCUIT, DIMMING DEVICE, LED ILLUMINATION FIXTURE, LED ILLUMINATION DEVICE, AND LED ILLUMINATION SYSTEM

This nonprovisional application claims priority under 35 U.S.C. §119(a) on Patent Application No. 2010-024376 filed in Japan on Feb. 5, 2010, the entire contents of which are hereby incorporated by reference.

BACKGROUND OF THE INVENTION

1. Field of the Invention

The present invention relates to an LED drive circuit for driving an LED (light emitting diode), to a dimming device for dimming an LED, and to an LED illumination fixture, an LED illumination device, and an LED illumination system having an LED as a light source.

2. Description of Related Art

LEDs have such characteristics as low current consumption and long service life, and LED applications are expanding not only to display devices but to illumination fixtures and the like. In LED illumination fixtures, a plurality of LED units is often used in order to obtain the desired lighting intensity.

Common illumination fixtures usually use a commercial AC 100 V power supply, and in cases in which an LED illumination fixture is used in place of an incandescent bulb or other common illumination fixture, it is preferred that the LED illumination fixture also be configured to use a commercial AC 100 V power supply, the same as a common illumination fixture.

In the case of applying dimmer control to an incandescent bulb, a phase control dimmer (commonly referred to as an incandescent light control) is used in which dimmer control can easily be applied to the supply of power to the incandescent bulb by a single volume element, by switching on a switching element (usually a thyristor element or triac element) at a certain phase angle of an alternating-current power supply voltage.

FIG. 17 shows an example of the voltage of each component and the current waveform when an incandescent bulb 41 is operated by a phase control dimmer 2 (see FIG. 16). FIG. 17 shows the waveform of the output voltage $V_1$ of an alternating-current power supply 1, the waveform of the voltage $V_{41}$ across the terminals of the incandescent bulb 41, and the waveform of the current $I_{41}$ which flows to the incandescent bulb 41. When a triac Tri1 switches from off to on, the voltage $V_{41}$ across the terminals of the incandescent bulb 41 rapidly increases, the current $I_{41}$ which flows to the incandescent bulb 41 also rapidly increases, and the incandescent bulb 41 is lit. Since current continues to flow to the incandescent bulb 41 thereafter as long as the triac Tri1 is on, the incandescent bulb 41 remains lit until the output voltage $V_1$ of the alternating-current power supply 1 reaches a value near 0 V.

However, when the incandescent bulb 41 is dimmed by the phase control dimmer 2 as shown in FIG. 16, flickering or blinking is known to occur, and normal dimming is not possible when a low-wattage incandescent bulb is used as the incandescent bulb 41.

The same type of phase control dimmer used for dimmer control of an incandescent bulb is preferably used in cases in which dimmer control is applied to an LED illumination fixture that uses an alternating-current power supply. FIG. 18 shows an example of a conventional LED illumination system whereby dimmer control can be applied to an LED illumination fixture that uses an alternating-current power supply.

The LED illumination system shown in FIG. 18 is provided with a phase control dimmer 2, an LED module 3, and an LED drive circuit which has a diode bridge DB1, a switching control circuit CNT1, a switching element Q1, a coil L2, a diode D1, a capacitor C4, and a resistor R2. In the LED illumination system shown in FIG. 18, the switching control circuit CNT1 detects the value of the current flowing to the resistor R2 and the root-mean-square value of the voltage $V_2$ that occurs at the positive output terminal of the diode bridge DB1, and controls the on/off state of the switching element Q1 on the basis of these detection results.

FIGS. 19A and 19B show examples of the waveform of the voltage $V_2$ that occurs at the positive output terminal of the diode bridge DB1 in the LED illumination system shown in FIG. 18. FIG. 19A shows the waveform of the voltage $V_2$ at a bright dimmer level, and FIG. 19B shows the waveform of the voltage $V_2$ at a dark dimmer level. The voltage-current characteristic of the LED module 3 is shown in FIG. 20.

When the bright dimmer level is set, the triac Tri1 switches from off to on at a small phase angle (e.g., 45°), the voltage $V_2$ occurring at the positive output terminal of the diode bridge DB1 rapidly rises (see FIG. 19A), and the LED module 3 is lit. Lighting of the LED module 3 is then maintained as long as the voltage across the terminals of the LED module 3 is above the forward voltage of the LED module 3. At this time, the LED module 3 is controlled at the operating point A in FIG. 20.

When the dark dimmer level is set, the triac Tri1 switches from off to on at a large phase angle (e.g., 141°), the voltage $V_2$ occurring at the positive output terminal of the diode bridge DB1 rapidly rises (see FIG. 19B), and the LED module 3 is lit. Lighting of the LED module 3 is then maintained as long as the voltage across the terminals of the LED module 3 is above the forward voltage of the LED module 3. At this time, the LED module 3 is controlled at the operating point C in FIG. 20.

The current of the LED module 3 must be kept constant in order to maintain a constant brightness. However, small variations in the current value of the LED module 3 are unavoidable due to the temperature characteristics of such components as the LED module 3, the switching power supply unit for feeding current to the LED module 3, the phase control dimmer 2, and the alternating voltage outputted from the alternating-current power supply 1, and switch noise of the triac Tri1 of the phase control dimmer 2, switching noise of the switching power supply unit for feeding current to the LED module 3, and other noise.

Since the noise described above is present in the same amount regardless of the amount of current of the LED module 3, the amount of noise is relatively large when the current of the LED module 3 is small, and relatively small when the current of the LED module 3 is large. For example, a change of 1 mA in the current value of the LED module 3 due to the noise described above corresponds to an amount of current variation of about 1% at operating point A, and does not produce a noticeable light (luminance) variation, whereas at operating point C, such a change in the current value produces flickering of the LED, and a noticeable light (luminance) variation occurs.

SUMMARY OF THE INVENTION

An object of the present invention is to provide an LED drive circuit, a phase control dimming device, an LED illumination fixture, an LED illumination device, and an LED illumination system capable of reducing LED flicker during low-luminance dimming.

The LED drive circuit (first aspect) according to the present invention for achieving the abovementioned objects is an LED drive circuit in which an alternating voltage from a phase control dimmer is input and an LED is driven; and the LED drive circuit comprises a phase angle detector for detecting the phase angle at which a phase control element inside the phase control dimmer switches from off to on; a switching power supply for feeding a current to the LED; a switching element connected in series to the LED; and a controller for controlling the switching power supply and the switching element in accordance with the output of the phase angle detector; wherein the controller places the switching element in an always-on state in a case in which the phase angle detected by the phase angle detector is equal to or less than a predetermined value, and the controller pulse-drives the switching element in a case in which the phase angle detected by the phase angle detector is greater than the predetermined value.

In the LED drive circuit according to the first aspect described above, a configuration (second aspect) may be adopted in which a current detector is provided for detecting the current flowing to the LED, and the controller controls the switching power supply and the switching element in accordance with the output of the phase angle detector and the output of the current detector.

In the LED drive circuit according to the first or second aspect described above, a configuration (third aspect) may be adopted in which the controller limits the minimum value of the on-duty of the switching power supply when the switching element is in the on state.

In the LED drive circuit according to any of the first through third aspects described above, a configuration (fourth aspect) may be adopted in which the controller places the switching element in the off state when the current flowing to the LED is below a certain constant value.

In the LED drive circuit according to the fourth aspect described above, a configuration (fifth aspect) may be adopted in which the controller places the switching element in the on state in accordance with the period of the alternating voltage.

In the LED drive circuit according to any of the first through third aspects described above, a configuration (sixth aspect) may be adopted in which the controller places the switching element in the always-on state and stops lighting of the LED when the phase angle detected by the phase angle detector is greater than a certain constant value.

In the LED drive circuit according to any of the first through third aspects described above, a configuration (seventh aspect) may be adopted in which the controller controls the peak value of the current flowing to a switching element inside the switching power supply in accordance with the input voltage of the switching power supply.

In the LED drive circuit according to any of the first through third aspects described above, a configuration (eighth aspect) may be adopted in which the controller stops operation of the switching power supply when the input voltage of the switching power supply is below a certain constant value.

In the LED drive circuit according to any of the first through eighth aspects described above, a configuration (ninth aspect) may be adopted in which the switching power supply is a step-up switching power supply circuit.

In the LED drive circuit according to the ninth aspect described above, a configuration (tenth aspect) may be adopted in which the controller has a first drive circuit for controlling the on/off switching of the switching element inside the switching power supply; a second drive circuit for performing analog control of a voltage fed to a control terminal of the switching element inside the switching power supply so as to make constant the value of the current flowing to the switching element inside the switching power supply; and a selector for selecting any one of driving of the switching power supply by the first drive circuit, and driving of the switching power supply by the second drive circuit, in accordance with the input voltage of the switching power supply, the input current of the LED drive circuit, or the current flowing to the LED.

In the LED drive circuit according to the tenth aspect described above, a configuration (eleventh aspect) may be adopted in which it is possible to switch the value of the current flowing to the switching element inside the switching power supply which is made constant by the control of the second drive circuit.

In the LED drive circuit according to the tenth aspect described above, a configuration (twelfth aspect) may be adopted in which operation of the second drive circuit is stopped when the selector selects driving of the switching power supply by the first drive circuit.

In the LED drive circuit according to any of the first through eighth aspects described above, a configuration (thirteenth aspect) may be adopted in which the switching power supply is a step-down switching power supply circuit.

In the LED drive circuit according to any of the first through eighth aspects described above, a configuration (fourteenth aspect) may be adopted in which the switching power supply is a switching power supply circuit having a transformer.

The LED illumination fixture according to the present invention comprises (fifteenth aspect) the LED drive circuit according to any of the first through fourteenth aspects described above, and an LED connected to the output side of the LED drive circuit.

The LED illumination device according to the present invention comprises (sixteenth aspect) the LED drive circuit according to any of the first through fourteenth aspects described above, or the LED illumination fixture according to the fifteenth aspect described above.

The LED illumination system according to the present invention comprises (seventeenth aspect) the LED illumination fixture according to the fifteenth aspect described above or the LED illumination device according to the sixteenth aspect described above, and a phase control dimmer connected to the input side of the LED illumination fixture or LED illumination device.

The dimming device according to the present invention comprises (eighteenth aspect) the LED drive circuit according to any of the first through fourteenth aspects described above, and a phase control dimmer for feeding an alternating voltage to the LED drive circuit.

The LED illumination system according to the present invention may comprise (nineteenth aspect) an LED illumination fixture and the dimming device according to the eighteenth aspect described above, connected to the input side of the LED illumination fixture.

Through the present invention, since a switching element connected in series to an LED is pulse-driven during low-luminance dimming, the LED can be prevented from being controlled at an operating point that is susceptible to noise, such as operating point C in FIG. 2B and FIG. 20. It is therefore possible to reduce flickering of the LED during low-luminance dimming.

DETAILED DESCRIPTION OF PREFERRED EMBODIMENTS

Embodiments of the present invention will be described hereinafter with reference to the drawings.

First Embodiment

Figure 1:
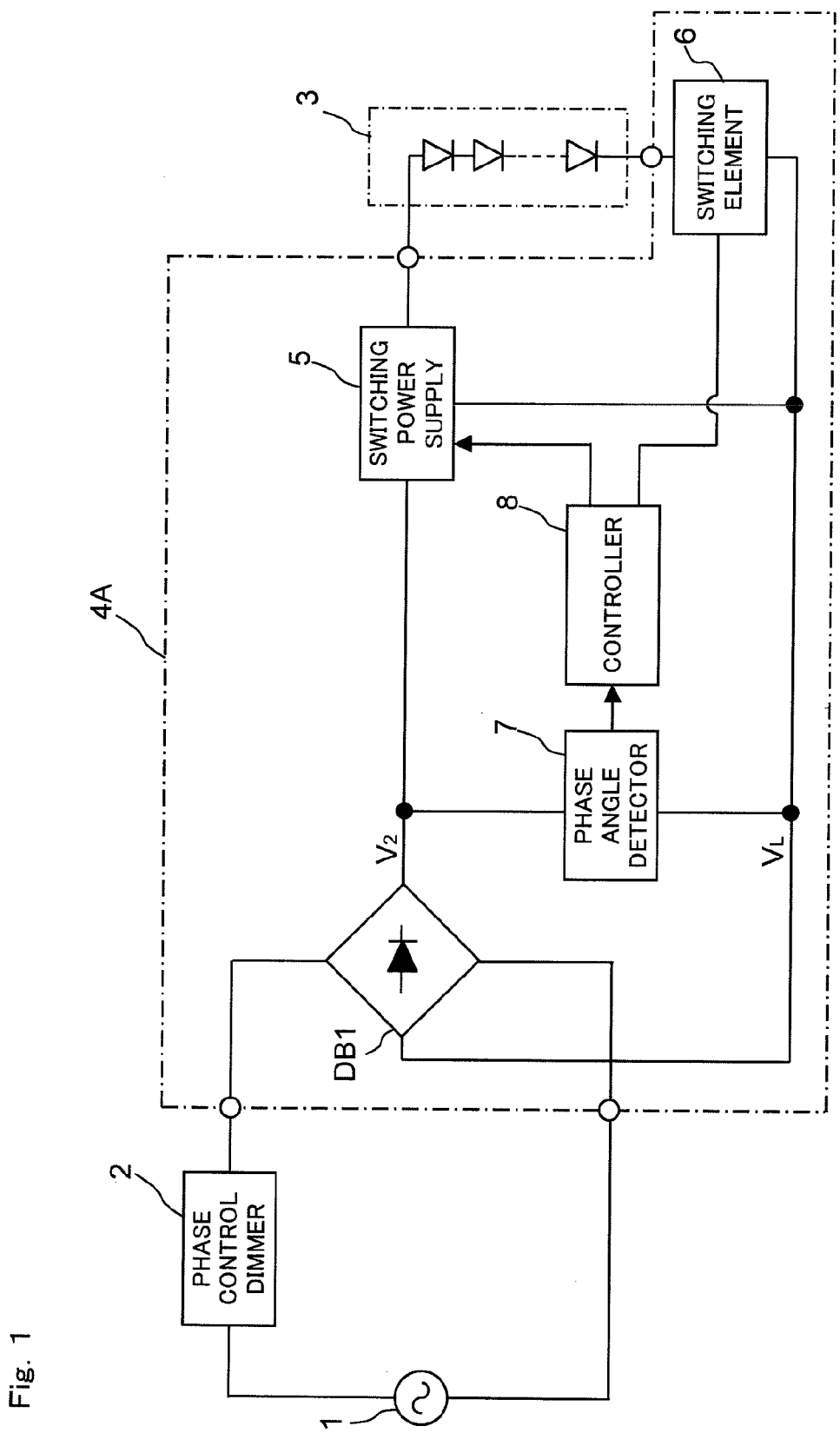
FIG. 1 is a view showing the configuration of the LED illumination system according to a first embodiment of the present invention.

FIG. 1 shows the configuration of the LED illumination system according to a first embodiment of the present invention. The same reference symbols are used in FIG. 1 to refer to components that are the same as those in FIG. 18, and no detailed description thereof will be given. The LED illumination system according to the first embodiment of the present invention shown in FIG. 1 is provided with a phase control dimmer 2, an LED module 3, and an LED drive circuit 4A. The LED drive circuit 4A is an example of the LED drive circuit according to the present invention, and has a diode bridge DB1, a switching power supply 5, a switching element 6, a phase angle detector 7 for detecting the phase angle when the output voltage ($V_2-V_L$) of the diode bridge DB1 rapidly rises, and a controller 8 for controlling the switching power supply 5 and the switching element 6 in accordance with the phase angle detected by the phase angle detector 7. In the LED illumination system according to the first embodiment of the present invention shown in FIG. 1, an alternating-current power supply 1 and the phase control dimmer 2 are connected in series to the input side of the diode bridge DB1, the input side of the switching power supply 5 is connected to the output side of the diode bridge DB1, and the switching element 6 and the LED module 3 composed of one or more LEDs are connected in series to the output side of the switching power supply 5.

In the present embodiment, the controller 8 applies feedback control to the switching power supply 5 by feeding back the output voltage of the switching power supply 5 or the output electric power of the switching power supply 5, for example.

Figure 2A:
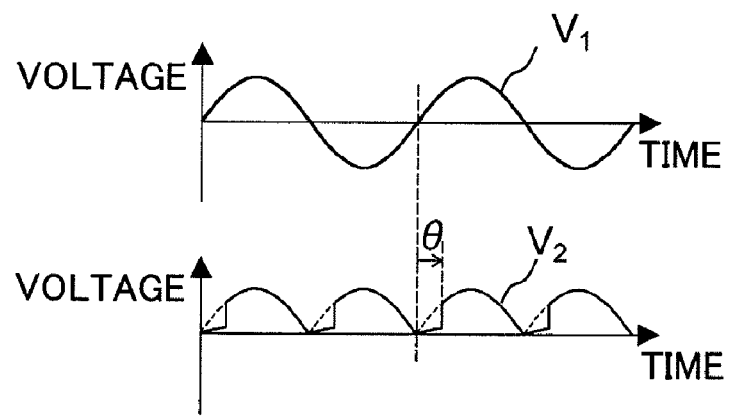
FIG. 2A is a view showing an example of the waveform of the output voltage of the alternating-current power supply, and the waveform of the voltage that occurs at the positive output terminal of the diode bridge.
Figure 2B:
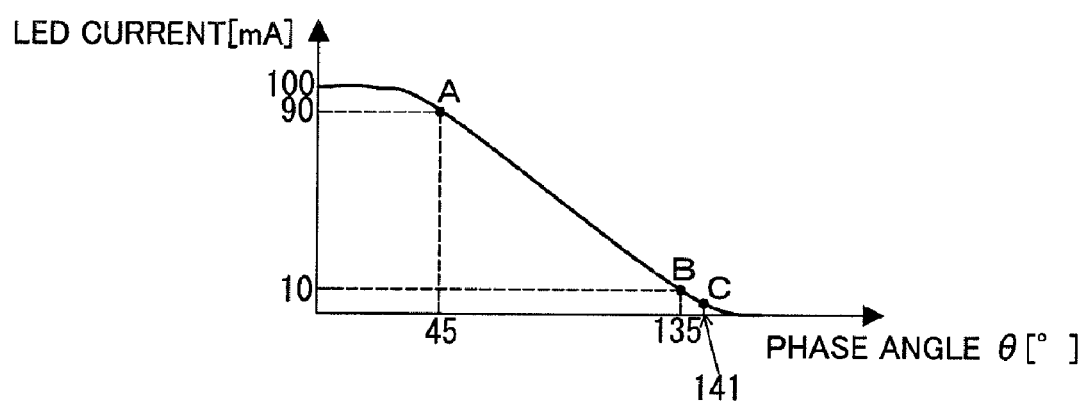
FIG. 2B is a view showing an example of the ideal curve of the phase angle of the voltage that occurs at the positive output terminal of the diode bridge and the current of the LED module.
Figure 3A:
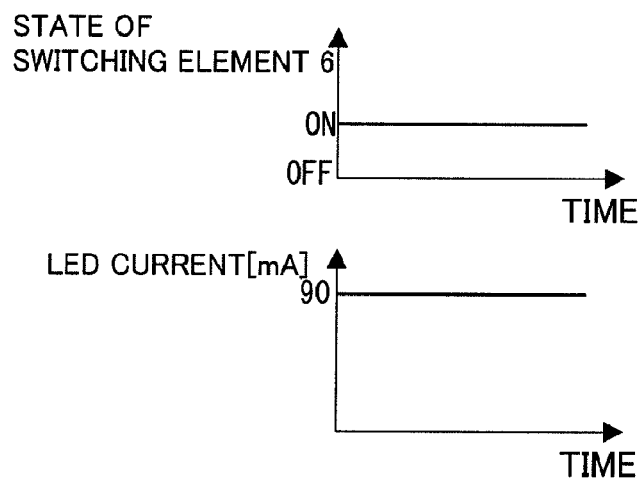
FIG. 3A is a timing chart showing the state of the switching element and the current of the LED module in a case in which the phase control element of the phase control dimmer switches from off to on at a phase angle of 45°.
Figure 3B:
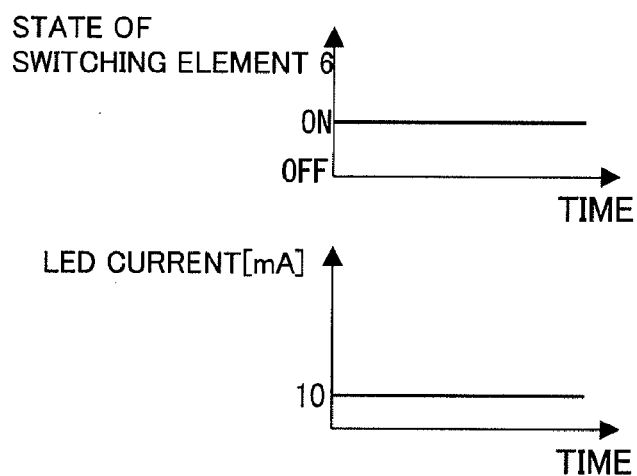
FIG. 3B is a timing chart showing the state of the switching element and the current of the LED module in a case in which the phase control element of the phase control dimmer switches from off to on at a phase angle of 135'.
Figure 3C:
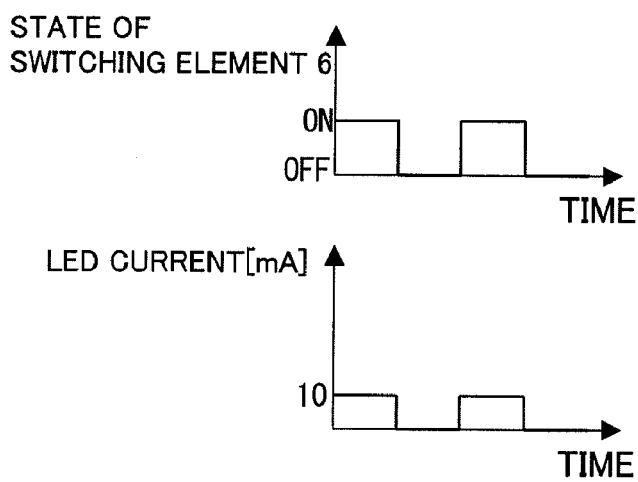
FIG. 3C is a timing chart showing the state of the switching element and the current of the LED module in a case in which the phase control element of the phase control dimmer switches from off to on at a phase angle of 141'.

FIG. 2A shows an example of the waveform of the output voltage $V_1$ of the alternating-current power supply 1, and the waveform of the voltage $V_2$ that occurs at the positive output terminal of the diode bridge DB1 in the LED illumination system according to the first embodiment of the present invention shown in FIG. 1. FIG. 2B shows an example of the ideal curve of the phase angle of the voltage $V_2$ and the current of the LED module 3. FIG. 3A is a timing chart showing the state of the switching element 6 and the current of the LED module 3 in a case in which the phase control element (e.g., triac) of the phase control dimmer 2 switches from off to on at a phase angle of 45°; FIG. 3B is a timing chart showing the state of the switching element 6 and the current of the LED module 3 in a case in which the phase control element (e.g., triac) of the phase control dimmer 2 switches from off to on at a phase angle of 135°; and FIG. 3C is a timing chart showing the state of the switching element 6 and the current of the LED module 3 in a case in which the phase control element (e.g., triac) of the phase control dimmer 2 switches from off to on at a phase angle of 141°.

In a case in which a dimmer level is set in which the phase control element (e.g., triac) of the phase control dimmer 2 switches from off to on at a phase angle of 135° or less, i.e., in a case in which the phase angle detected by the phase angle detector 7 is 135° or less, the switching element 6 is placed in an always-on state through the control of the controller 8, and the switching power supply 5 feeds a current that is in accordance with the ideal curve shown in FIG. 2B to the LED module 3. In this arrangement, the operating point B in FIG. 2B is the operating point at which the current value is smallest in the range in which no flickering occurs even when the current of the LED module 3 is affected by noise and other effects. In the present embodiment, in a case in which a dimmer level is set in which the phase control element (e.g., triac) of the phase control dimmer 2 switches from off to on at a phase angle of 135°, the LED module 3 is controlled at operating point B. Cases in which a dimmer level is set in which a current equal to or greater than that of operating point B steadily flows to the LED module 3 are referred to as high-luminance dimming, and other cases are referred to as low-luminance dimming.

In a case in which a dimmer level is set in which the phase control element (e.g., triac) of the phase control dimmer 2 switches from off to on at a phase angle greater than 135°, i.e., in a case in which the phase angle detected by the phase angle detector 7 is greater than 135°, the switching element 6 performs a switching operation through the control of the controller 8, and the switching power supply 5 feeds electric power to the LED module 3 so that operating point B in FIG. 2B is in effect as long as the switching element 6 is in the on state. For example, when the controller 8 pulse-drives the switching element 6 at an on-duty of 50% as shown in FIG. 3C, the average value of the current flowing to the LED module 3 is half that shown in FIG. 3B. In a case in which a dimming level is set in which the phase control element (e.g., triac) of the phase control dimmer 2 switches from off to on at a phase angle greater than 135°, the controller 8 adjusts the on-duty of pulse driving of the switching element 6 continuously or in stages in accordance with the phase angle detected by the phase angle detector 7.

Through such an operation, the LED module 3 can be prevented from being controlled at an operating point that is susceptible to noise, such as operating point C in FIG. 2B and FIG. 2O, and flickering of the LED module 3 during low-luminance dimming can therefore be reduced.

Second Embodiment

Figure 4:
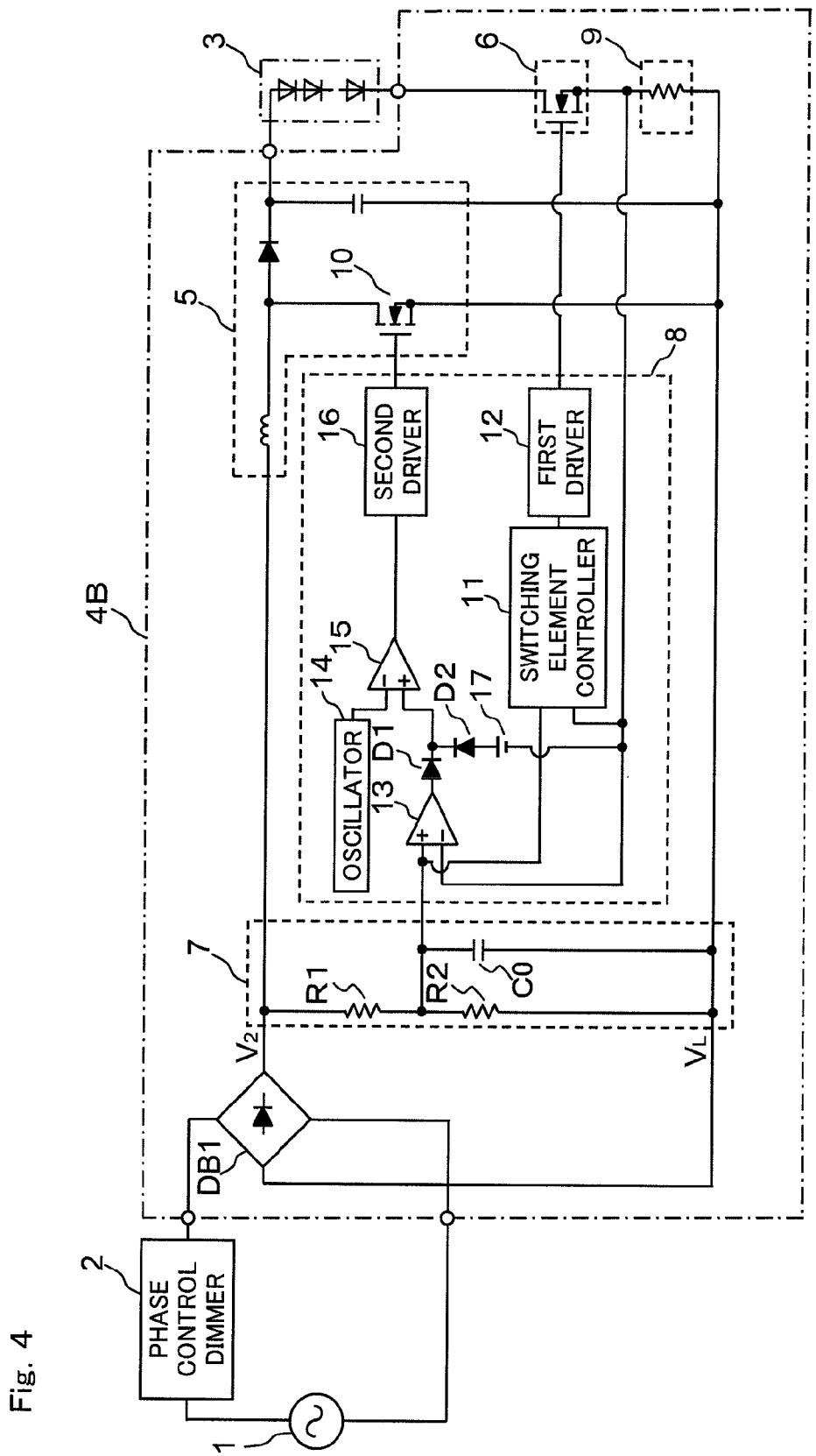
FIG. 4 is a view showing the configuration of the LED illumination system according to a second embodiment of the present invention.

FIG. 4 shows the configuration of the LED illumination system according to a second embodiment of the present invention. The same reference symbols are used in FIG. 4 to refer to components that are the same as those in FIG. 1, and no detailed description thereof will be given.

In the configuration of the LED illumination system according to the second embodiment of the present invention shown in FIG. 4, the LED drive circuit 4A of the LED illumination system according to the first embodiment of the present invention shown in FIG. 1 is substituted with an LED drive circuit 4B.

The LED drive circuit 4B has the configuration of the LED drive circuit 4A with the addition of a current detector 9 for detecting the current of the LED module 3. In the LED drive circuit 4B, a step-up switching power supply circuit having a switching element 10 is used as the switching power supply 5, the switching element 6 is composed of an N-channel MOS transistor, the phase angle detector 7 is composed of voltage-dividing resistors R1 and R2 and a capacitor C0, and the controller 8 is composed of a switching element controller 11, a first driver 12, an error amplifier 13, an oscillator 14, a comparator 15, a second driver 16, backflow prevention diodes D1 and D2, and a constant-voltage supply 17.

In the present embodiment, the controller 8 applies feedback control to the switching power supply 5 by feeding back the current of the LED module 3. The light intensity of the LED module 3 is proportional to the current of the LED module 3. Therefore, a configuration in which the controller 8 applies feedback control to the switching power supply 5 by feeding back the current of the LED module 3 enables the light intensity of the LED module 3 to be controlled with greater precision than a configuration (the configuration of the first embodiment described above) in which the controller 8 applies feedback control to the switching power supply 5 by feeding back the output voltage of the switching power supply 5 or the output electric power of the switching power supply 5.

In the phase angle detector 7, the output voltage $(V_2-V_L)$ of the diode bridge DB1 is divided by the voltage-dividing resistors R1 and R2, and the divided voltages are averaged by the capacitor C0. This averaging is made possible by the use of voltage-dividing resistors R1 and R2 and a capacitor C0 having a time constant at a lower frequency (e.g., 5 to 6 Hz) than the frequency (50 Hz or 60 Hz) of the output voltage of the alternating-current power supply 1.

The error amplifier 13 outputs an error signal which is high-level in cases in which the output of the phase angle detector 7 is greater than the output of the current detector 9, and low-level in cases in which the output of the phase angle detector 7 is not greater than the output of the current detector 9. The comparator 15 outputs a PWM (Pulse Width Modulation) signal which is high-level in cases in which the error signal outputted from the error amplifier 13 is greater than a triangular-wave signal outputted from the oscillator 14, and low-level in cases in which error signal outputted from the error amplifier 13 is not greater than a triangular-wave signal outputted from the oscillator 14. The second driver 16 places the switching element 10 of the switching power supply 5 in the on state when the PWM signal outputted from the comparator 15 is high-level, and places the switching element 10 of the switching power supply 5 in the off state when the PWM signal outputted from the comparator 15 is low-level.

A case is assumed in which the voltage division ratio in the phase angle detector 7 is 1/50, the current-voltage conversion coefficient of the current detector 9 is 18Ω, and the amplitude of the output voltage of the alternating-current power supply 1 is 141 V.

In a case in which a dimmer level is set in which the phase control element (e.g., triac) of the phase control dimmer 2 switches from off to on at a phase angle of 0°, i.e., in a case in which the phase angle detected by the phase angle detector 7 is 0°, since the voltage $(V_2-V_L)$ is approximately 90 V when averaged, the voltage applied to the non-inverting input terminal of the error amplifier 13 is 1.8 V (=90 V/50). In this case, since the switching power supply 5 is subjected to PWM control so that the output of the current detector 9 is 1.8 V, the current of the LED module 3 is 100 mA (=1.8 V×1000/18Ω).

In a case in which a dimmer level is set in which the phase control element (e.g., triac) of the phase control dimmer 2 switches from off to on at a phase angle of 90°, i.e., in a case in which the phase angle detected by the phase angle detector 7 is 90°, since the voltage $(V_2-V_L)$ is approximately 45 V when averaged, the voltage applied to the non-inverting input terminal of the error amplifier 13 is 0.9 V (=45 V/50). In this case, since the switching power supply 5 is subjected to PWM control so that the output of the current detector 9 is 0.9 V, the current of the LED module 3 is 50 mA (=0.9 V×1000/18Ω).

The switching element controller 11 places the switching element 6 in an always-on state during high-luminance dimming, and pulse-drives the switching element 6 during low-luminance dimming.

In the present embodiment, the constant-voltage supply 17 is provided in order to prevent the current of the LED module 3 from being less than that of operating point B (see FIG. 2B and FIG. 2O) when the switching element 6 is in the on state, and the lower limit of the voltage inputted to the non-inverting input terminal of the comparator 15 is set to the constant voltage outputted from the constant-voltage supply 17. The minimum value of the on-duty of the switching power supply 5 is thereby restricted when the switching element 6 is in the on state. The value set as the lower limit is preferably equal to the voltage inputted to the non-inverting input terminal of the comparator 15 when the output of the phase angle detector 7 is 0.18 V and the current of the LED module 3 is 10 mA.

Figure 5:
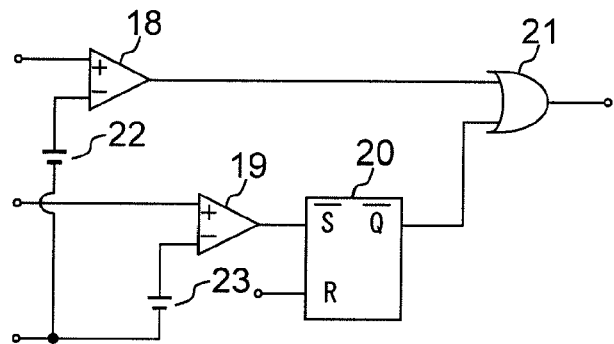
FIG. 5 is a view showing an example of the configuration of the switching element controller provided to the LED illumination system shown in FIG. 4.

An example of the configuration of the switching element controller 11 will next be described with reference to FIG. 5. In the example configuration shown in FIG. 5, the switching element controller 11 is provided with comparators 18 and 19, a flip-flop 20, an OR circuit 21, and constant-voltage supplies 22 and 23. The output of the phase angle detector 7 is inputted to the non-inverting input terminal of the comparator 18, the output of the current detector 9 is inputted to the non-inverting input terminal of the comparator 19, and the output of the OR circuit 21 is fed to the first driver 12.

Since the switching element 6 is in the always-on state during high-luminance dimming, the output voltage of the constant-voltage supply 22 is set so that the output of the phase angle detector 7 is greater than the output voltage of the constant-voltage supply 22 during high-luminance dimming. In the example described above, the current of the LED module 3 is 10 mA (1/10 the maximum current of 100 mA) when the output of the phase angle detector 7 is 0.18 V. Consequently, by setting the output voltage of the constant-voltage supply 22 to 0.18 V, the output of the comparator 18 is always high-level during high-luminance dimming, and the switching element 6 can be placed in an always-on state.

Conversely, during low-luminance dimming, since the output of the phase angle detector 7 is below 0.18 V, and a low-level signal is fed from the comparator 18 to the OR circuit 21, the OR circuit 21 can control the on/off state of the switching element 6 in accordance with the output of the comparator 19.

The OR circuit 21 places the switching element 6 in the off state when the output of the current detector 9 is not greater than the output voltage of the constant-voltage supply 23, i.e., when the current detected by the current detector 9 is below a certain constant value. Through the resetting of the flip-flop 20, the off state of the switching element 6 is reset in the period of the alternating voltage outputted from the alternating-current power supply 1. The period of this resetting can be detected by detecting the output voltage of the diode bridge DB1 or the rising of the output voltage thereof.

Figure 6A:
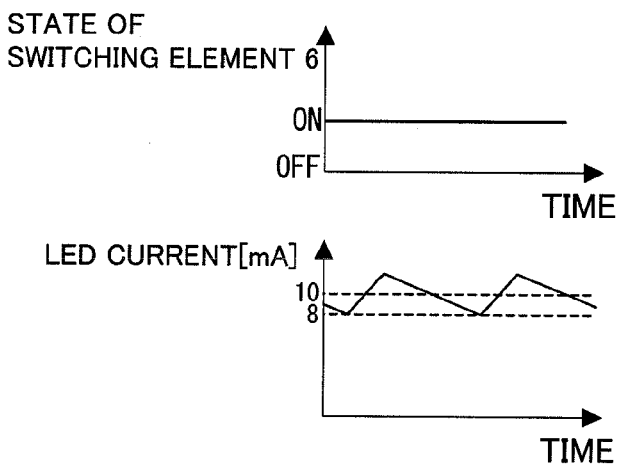
FIG. 6A is a timing chart showing the state of the switching element and the current flowing to the LED module at the time at which the current flowing to the LED module is smallest during high-luminance dimming.
Figure 6B:
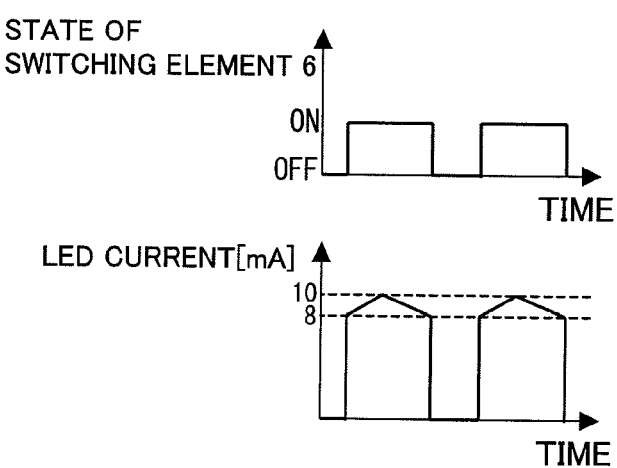
FIG. 6B is a timing chart showing the state of the switching element and the current flowing to the LED module during low-luminance dimming.

FIG. 6A is a timing chart showing the state of the switching element 6 and the current flowing to the LED module 3 at the time at which the current flowing to the LED module 3 is smallest during high-luminance dimming. FIG. 6B is a timing chart showing the state of the switching element 6 and the current flowing to the LED module 3 during low-luminance dimming. A ripple current which occurs in the current flowing to the LED module 3 herein is created by fluctuations in the voltage ($V_2-V_L$), and occurs at the period of the output voltage of the alternating-current power supply 1. (The current fed to the LED module 3 from the switching power supply 5 decreases when the voltage ($V_2-V_L$) is low.)

Although the minimum value of the on-duty of the switching power supply 5 is restricted when the switching element 6 is in the on state, since the average value of the voltage ($V_2-V_L$) decreases as the phase angle increases, the average value of the current flowing to the LED module 3 decreases, and becomes lower than that of operating point B in FIG. 2B. When the current flowing to the LED module 3 is below 8 mA, for example, the controller 8 places the switching element 6 in the off state. Through this control operation, during low-luminance dimming, the time during which the switching element 6 is off can be increased in conjunction with the increase of the phase angle at which the phase control element (e.g., triac) of the phase control dimmer 2 switches from off to on.

<<Modifications>>

Two embodiments of the LED illumination system according to the present invention are described above, but the present invention is, of course, not limited by these embodiments, and various modifications thereof are possible within the intended scope of the invention. Several such modifications are described below.

<First Modification>

In the first or second embodiment described above, the controller 8 may be configured so as to set the on-duty of pulse driving of the switching element 6 to 0%, place the switching element 6 in an always-off state, and stop lighting of the LED module 3 when the phase angle detected by the phase angle detector 7 increases past a certain constant value.

In an LED illumination system having a phase control dimmer, depending on the combination of the LED and the phase control dimmer, there are cases in which the LED is lit even at the maximum phase angle of the phase control dimmer. In such cases, there is a risk of slight lighting of the LED due to switch noise of the phase control element of the phase control dimmer, switching noise of the switching power supply for feeding current to the LED, and other noise. Therefore, it is sometimes desirable that the light be extinguished when dimming is at the lowest luminance. For example, lighting may be extinguished at a low-luminance dimming level of 1% or lower by causing the controller 8 to execute control for placing the switching element 6 in an always-off state when the output of the phase angle detector 7 is below a certain constant value (e.g., 0.018 V).

<Second Modification>

Figure 7:
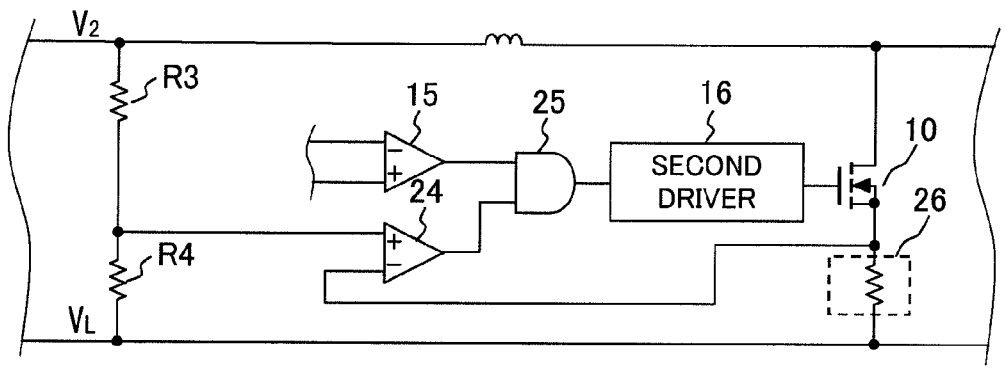
FIG. 7 is a view showing an overview of a second modification.

The LED illumination system according to the second embodiment of the present invention shown in FIG. 4 may be modified so that the error amplifier 13 outputs the error between a predetermined value and the output electric power of the switching power supply 5, and the voltage-dividing resistors R3 and R4, comparator 24, AND circuit 25, and current detector 26 shown in FIG. 7 are added to the LED illumination system.

The comparator 24 compares the divided voltage value of the voltage ($V_2-V_L$), and the output (voltage value proportional to the current flowing to the switching element 10 of the switching power supply 5) of the current detector 26. The second driver 16 drives the switching element 10 in accordance with the logical product of the output of the comparator 15 and the output of the comparator 24, places the switching element 10 in the off state when the current flowing to the switching element 10 increases, and stops operation of the switching power supply 5.

In the present modification, the switching power supply 5 is controlled so that the output electric power of the switching power supply 5 is substantially constant. The voltage ($V_2 - V_L$) varies from 0 V to 141 V (in a case in which the alternating-current power supply 1 is an alternating power supply having an effective voltage of 100 V). Therefore, when the voltage-dividing resistors R3 and R4, comparator 24, AND circuit 25, and current detector 26 shown in FIG. 7 are not added, a large amount of current flows to the switching element 10 when the voltage ($V_2 - V_L$) is low, and little current flows to the switching element 10 when the voltage ($V_2 - V_L$) is high. Such current variation contributes to a reduced power factor.

Consequently, in order to enhance the power factor in the present modification, the voltage-dividing resistors R3 and R4, comparator 24, AND circuit 25, and current detector 26 shown in FIG. 7 are added so as to reduce the current flowing to the switching element 10 when the voltage ($V_2 - V_L$) is low and increase the current flowing to the switching element 10 when the voltage ($V_2 - V_L$) is high, and the peak value of the current flowing to the switching element 10 is controlled in accordance with the input voltage (=voltage ($V_2 - V_L$)) of the switching power supply 5.

By thus restricting the current that flows to the switching element 10, the current that flows to the coil and switching element 10 of the switching power supply 5 can be restricted, the rated current of the coil and switching element 10 of the switching power supply 5 can be set to a small value, and the cost and space requirements of the switching power supply 5 can be reduced.

<Third Modification>

Figure 8:
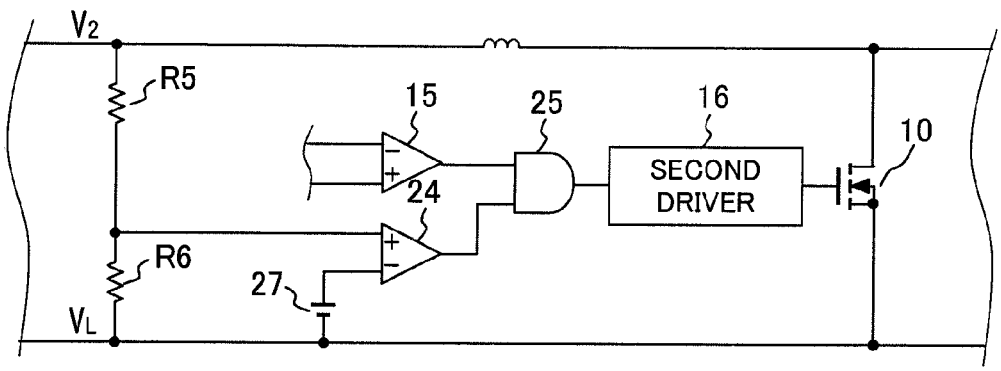
FIG. 8 is a view showing an overview of a third modification.

The voltage-dividing resistors R5 and R6, comparator 24, AND circuit 25, and constant-voltage supply 27 shown in FIG. 8 may be added to the LED illumination system according to the second embodiment of the present invention shown in FIG. 4.

In the LED illumination system according to the second embodiment of the present invention shown in FIG. 4, when the phase control element (e.g., triac) of the phase control dimmer 2 is off, the impedance in the phase control dimmer 2 is higher than the total impedance of the LED module 3 and the LED drive circuit 4B, energy is not fed from the phase control dimmer 2 to the LED drive circuit 4B, and current is not fed to the LED drive circuit 4B from the phase control dimmer 2. The controller 8 therefore no longer operates normally. Consequently, in order to prevent abnormal operation of the controller 8 when the phase control element (e.g., triac) of the phase control dimmer 2 is off, a configuration must be adopted in which the LED drive circuit 4B does not draw current from the phase control dimmer 2.

Therefore, in the present modification, the switching element 10 is placed in the off state when the voltage ($V_2 - V_L$) is low, and operation of the switching power supply 5 is stopped. The value of the voltage outputted from the constant-voltage supply 27 is set to a value equal to or higher than the divided voltage of the voltage ($V_2 - V_L$), generated by the voltage-dividing resistors R5 and R6, when the phase control element (e.g., triac) of the phase control dimmer 2 is off, and equal to or lower than the divided voltage of the voltage ($V_2 - V_L$), generated by the voltage-dividing resistors R5 and R6, when the phase control element (e.g., triac) of the phase control dimmer 2 is on and current is effectively fed to the LED module 3 (e.g., the switching element 10 is placed in the off state when the output voltage of the constant-voltage supply 27 is 1 V and the voltage ($V_2 - V_L$) is 50 V or lower).

<Fourth Modification>

Figure 9:
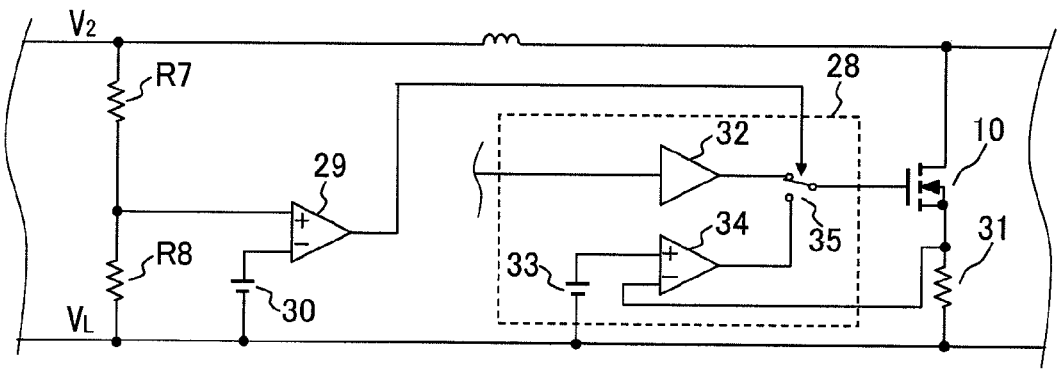
FIG. 9 is a view showing an overview of a fourth modification.

In the LED illumination system according to the second embodiment of the present invention shown in FIG. 4, a configuration may be adopted in which the second driver 16 is substituted with the drive 28 shown in FIG. 9, and the voltage-dividing resistors R7 and R8, comparator 29, reference voltage supply 30, and current detector 31 shown in FIG. 9 are added. The drive 28 is composed of a drive circuit 32 for controlling the on/off switching of the switching element 10 in accordance with the output of the comparator 15; a reference voltage supply 33; a drive circuit 34 for performing analog control of a voltage fed to a control terminal of the switching element 10 in accordance with the difference between the reference voltage outputted from the reference voltage supply 33 and the output of the current detector 31; and a switch 35 for alternatively selecting the output of the drive circuit 32 or the output of the drive circuit 34 and feeding the selected output to the control terminal of the switching element 10.

When the divided voltage of the voltage ($V_2 - V_L$), generated by the voltage-dividing resistors R7 and R8, is greater than the voltage outputted from the reference voltage supply 30, the switch 35 selects the output of the drive circuit 32. On the other hand, when the divided voltage of the voltage ($V_2 - V_L$), generated by the voltage-dividing resistors R7 and R8 is not greater than the voltage outputted from the reference voltage supply 30, the switch 35 selects the output of the drive circuit 34.

When the voltage ($V_2 - V_L$) is low in a case in which the phase control element (e.g., triac) of the phase control dimmer 2 is off, the total impedance of the LED module 3 and the LED drive circuit 4B can be made lower than the impedance in the phase control dimmer 2 by switching on the switching element 10.

When the voltage ($V_2 - V_L$) is low in a case in which the phase control element (e.g., triac) of the phase control dimmer 2 is on, when the switching element 10 is switched off and the operation of the switching power supply 5 is stopped, the phase control element (e.g., triac) of the phase control dimmer 2 may potentially switch off before the alternating voltage outputted from the alternating-current power supply 1 reaches 0 V. Since flickering may occur in the LED module 3 at this time, an operation is necessary to feed a constant current to the switching element 10 when the voltage ($V_2 - V_L$) is low in a case in which the phase control element (e.g., triac) of the phase control dimmer 2 is on. The necessary operation is achieved by the switch 35 selecting the output of the drive circuit 34 when the divided voltage of the voltage ($V_2 - V_L$), generated by the voltage-dividing resistors R7 and R8, is greater than the voltage outputted from the reference voltage supply 30, as described above.

The present applicant has previously applied for a patent on an invention relating to an LED drive circuit for feeding a current of several hundred mA for several hundred µs when the voltage ($V_2 - V_L$) rises, in order to prevent malfunctioning due to resonance of the phase control dimmer 2 (Japanese Patent Application No. 2009-53307, corresponding to U.S. patent application Ser. No. 12/715,467). In the configuration shown in FIG. 9, since the switch 35 selects the output of the drive circuit 34 and the switching power supply 5 operates with a constant current when the voltage ($V_2 - V_L$) rises, malfunctioning of the phase control dimmer 2 due to resonance can be prevented. Although current is lost by a current extractor in the invention proposed in Japanese Patent Application No. 2009-53307, in the configuration shown in FIG. 9, current is accumulated by the coil in the switching power supply 5, and current loss is therefore minimal.

Since the voltage fed to the control terminal of the switching element 10 is controlled in analog fashion in the drive circuit 34, current consumption increases (e.g., several hundred μA). The power supply feed to the drive circuit 34 is therefore preferably stopped in order to reduce current consumption while the drive circuit 32 is selected by the switch 35. This operation can easily be realized by providing an on/off switch to the power supply feed line to the drive circuit 34.

<Fifth Modification>

In the fourth modification described above, the selection of the output of the drive circuit 32 or the output of the drive circuit 34 is switched in accordance with the voltage ($V_2$–$V_L$), but a configuration may instead be adopted in which the current inputted to the LED drive circuit is detected, and the selection of the output of the drive circuit 32 or the output of the drive circuit 34 is switched in accordance with the current inputted to the LED drive circuit.

The phenomenon in which the phase control element (e.g., triac) of the phase control dimmer 2 switches off before the alternating voltage outputted from the alternating-current power supply 1 reaches 0 V occurs when the current of the phase control element (e.g., triac) of the phase control dimmer 2 is equal to or less than the hold current. Therefore, by detecting the current inputted to the LED drive circuit, the phenomenon described above can be prevented with good precision. The current inputted to the LED drive circuit can be detected by providing a resistor or other current detection means to the input terminal of the LED drive circuit.

<Sixth Modification>

In the fourth modification described above, the selection of the output of the drive circuit 32 or the output of the drive circuit 34 is switched in accordance with the voltage ($V_2$–$V_L$), but a configuration may instead be adopted in which the current flowing to the LED module 3 is detected, and the selection of the output of the drive circuit 32 or the output of the drive circuit 34 is switched in accordance with the current flowing to the LED module 3.

The phenomenon in which the phase control element (e.g., triac) of the phase control dimmer 2 switches off before the alternating voltage outputted from the alternating-current power supply 1 reaches 0 V occurs when the current of the phase control element of the phase control dimmer 2 is equal to or less than the hold current. Detection of the output current (=current flowing to the LED drive circuit) of the phase control dimmer 2 is therefore preferred from the perspective of preventing the abovementioned phenomenon with good precision, but it is also possible to prevent the abovementioned phenomenon by detecting the current flowing to the LED module 3. Since the current detector 9 can be used to detect the current flowing to the LED module 3, there is no need for a new detector.

<Seventh Modification>

A current on the order of several tens of mA must be applied in order to prevent the phenomenon in which the phase control element (e.g., triac) of the phase control dimmer 2 switches off before the alternating voltage outputted from the alternating-current power supply 1 reaches 0 V. On the other hand, a current on the order of several hundred mA must be applied in order to prevent resonant malfunctioning of the phase control dimmer 2.

Figure 10:
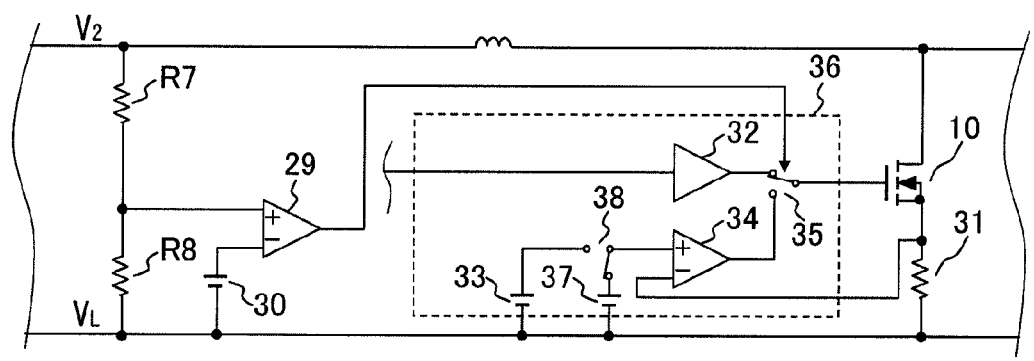
FIG. 10 is a view showing an overview of a seventh modification.

By adopting a configuration in which a target current to be controlled by a drive 36 is switched, as shown in FIG. 10, the problems described above can both be prevented by a configuration in which the switching element 10 is controlled by a single drive for controlling the on/off switching of the switching element 10 and a single drive for performing analog control of the voltage fed to the control terminal of the switching element 10. In contrast, in order to prevent both problems described above by a configuration in which there is no switching of the target current to be controlled by the drive for performing analog control of the voltage fed to the control terminal of the switching element 10, a configuration must be adopted in which the switching element 10 is controlled by a single drive for controlling the on/off switching of the switching element 10, and two drives for performing analog control of the voltage fed to the control terminal of the switching element 10.

The same reference symbols are used in FIG. 10 to refer to components that are the same as those in FIG. 9, and no detailed description of such components will be given. In the present modification, the drive 28 of the modification shown in FIG. 9 is substituted with a drive 36, as shown in FIG. 10. The drive 36 is formed by adding to the drive 28 a reference voltage supply 37 for outputting a reference voltage having a different value than that of the reference voltage supply 33, and a switch 38 for alternatively selecting the output of the reference voltage supply 33 or the output of the reference voltage supply 37 and feeding the selected output to the drive circuit 34.

During normal operation, the switch 38 selects the output of the reference voltage supply 33, and the current of the switching element 10 is controlled at several tens of mA (e.g., the current of the switching element 10 can be set to 50 mA by setting the current-voltage conversion coefficient of the current detector 31 to 1Ω and setting the reference voltage outputted from the reference voltage supply 33 to 50 mA).

After the phase control element (e.g., triac) of the phase control dimmer 2 switches on, in conditions in which a current of several hundred mA flows, the switch 38 selects the output of the reference voltage supply 37, and the current of the switching element 10 is controlled at several hundred mA (e.g., the current of the switching element 10 can be set to 250 mA by setting the current-voltage conversion coefficient of the current detector 31 to 1Ω and setting the reference voltage outputted from the reference voltage supply 37 to 250 mA).

<Eighth Modification>

Figure 11:
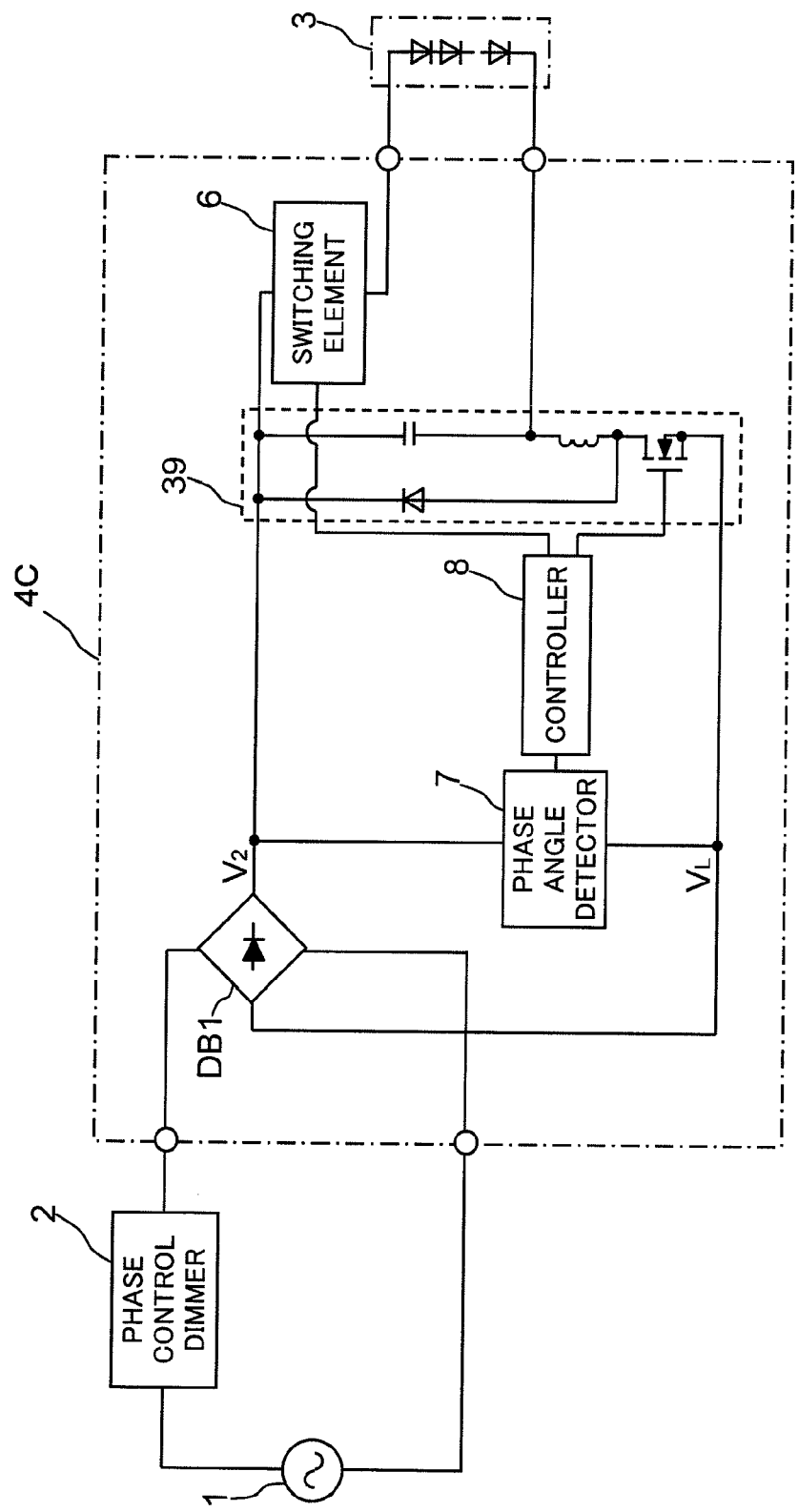
FIG. 11 is a view showing the configuration of the LED illumination system according to an eighth modification.

In the second embodiment of the present invention described above, the present invention is applied to an LED drive circuit provided with a step-up switching power supply circuit, but the present invention may also be applied to an LED drive circuit provided with a step-down switching power supply circuit, as shown in FIG. 11.

The LED illumination system according to the eighth modification shown in FIG. 11 is provided with the phase control dimmer 2, the LED module 3, and an LED drive circuit 4C. The LED drive circuit 4C is an example of the LED drive circuit according to the present invention, and has the diode bridge DB1, a step-down switching power supply circuit 39, the switching element 6, the phase angle detector 7 for detecting the phase angle when the voltage ($V_2$–$V_L$) occurring at the positive output terminal of the diode bridge DB1 rapidly rises, and the controller 8 for controlling the step-down switching power supply circuit 39 and the switching element 6 in accordance with the phase angle detected by the phase angle detector 7. In the LED illumination system according to the eighth modification shown in FIG. 11, the alternating-current power supply 1 and the phase control dimmer 2 are connected in series to the input side of the diode bridge DB1, the input side of the step-down switching power supply circuit 39 is connected to the output side of the diode bridge DB1, and the switching element 6 and the LED module 3 composed of one or more LEDs are connected in series to the output side of the step-down switching power supply circuit 39.

In the present modification, the controller 8 applies feedback control to the step-down switching power supply circuit 39 by feeding back the output voltage of the step-down switching power supply circuit 39 or the output electric power of the step-down switching power supply circuit 39, for example. A configuration may also be adopted in which the controller 8 applies feedback control to the step-down switching power supply circuit 39 by feeding back the current of the LED module 3, the same as in the second embodiment of the present invention described above.

In a case in which a dimmer level is set in which the phase control element (e.g., triac) of the phase control dimmer 2 switches from off to on at a phase angle of 135° or less, i.e., in a case in which the phase angle detected by the phase angle detector 7 is 135° or less, the switching element 6 is placed in an always-on state through the control of the controller 8, and the step-down switching power supply circuit 39 feeds a current which is in accordance with the ideal curve shown in FIG. 2B to the LED module 3.

On the other hand, in a case in which a dimmer level is set in which the phase control element (e.g., triac) of the phase control dimmer 2 switches from off to on at a phase angle greater than 135°, i.e., in a case in which the phase angle detected by the phase angle detector 7 is greater than 135°, the switching element 6 performs switching operation through the control of the controller 8, and the step-down switching power supply circuit 39 maintains the current value for operating point B in FIG. 2B and feeds the current to the LED module 3 as long as the switching element 6 is in the on state.

<Ninth Modification>

Figure 12:
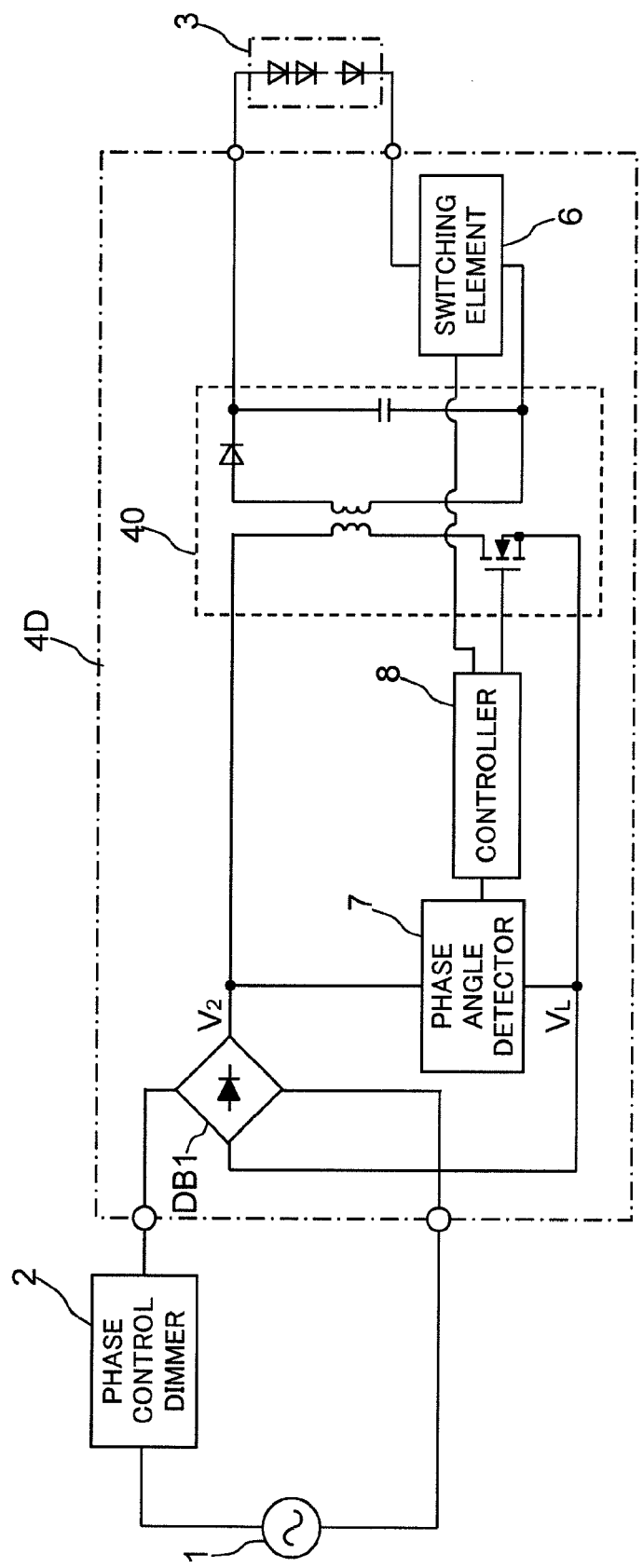
FIG. 12 is a view showing the configuration of the LED illumination system according to an ninth modification.

In the second embodiment of the present invention described above, the present invention is applied to an LED drive circuit provided with a transformerless step-up switching power supply circuit, but the present invention may also be applied to an LED drive circuit provided with a switching power supply circuit that has a transformer, as shown in FIG. 12.

The LED illumination system according to the ninth modification shown in FIG. 12 is provided with the phase control dimmer 2, the LED module 3, and an LED drive circuit 4D. The LED drive circuit 4D is an example of the LED drive circuit according to the present invention, and has the diode bridge DB1, a switching power supply circuit 40 having a flyback transformer (abbreviated hereinafter as switching power supply circuit 40), the switching element 6, the phase angle detector 7 for detecting the phase angle when the voltage ($V_2$–$V_L$) occurring at the positive output terminal of the diode bridge DB1 rapidly rises, and the controller 8 for controlling the switching power supply circuit 40 and the switching element 6 in accordance with the phase angle detected by the phase angle detector 7. In the LED illumination system according to the ninth modification shown in FIG. 12, the alternating-current power supply 1 and the phase control dimmer 2 are connected in series to the input side of the diode bridge DB1, the input side of the switching power supply circuit 40 is connected to the output side of the diode bridge DB1, and the switching element 6 and the LED module 3 composed of one or more LEDs are connected in series to the output side of the switching power supply circuit 40.

In the present modification, the controller 8 applies feedback control to the switching power supply circuit 40 by feeding back the output voltage of the switching power supply circuit 40 or the output electric power of the switching power supply circuit 40, for example. A configuration may also be adopted in which the controller 8 applies feedback control to the switching power supply circuit 40 by feeding back the current of the LED module 3, the same as in the second embodiment of the present invention described above.

In a case in which a dimmer level is set in which the phase control element (e.g., triac) of the phase control dimmer 2 switches from off to on at a phase angle of 135° or less, i.e., in a case in which the phase angle detected by the phase angle detector 7 is 135° or less, the switching element 6 is placed in an always-on state through the control of the controller 8, and the switching power supply circuit 40 feeds a current which is in accordance with the ideal curve shown in FIG. 2B to the LED module 3.

On the other hand, in a case in which a dimmer level is set in which the phase control element (e.g., triac) of the phase control dimmer 2 switches from off to on at a phase angle greater than 135°, i.e., in a case in which the phase angle detected by the phase angle detector 7 is greater than 135°, the switching element 6 performs switching operation through the control of the controller 8, and the switching power supply circuit 40 maintains the current value for operating point B in FIG. 2B and feeds the current to the LED module 3 as long as the switching element 6 is in the on state.

<<Product Form of the Illumination System According to the Present Invention>>

Product forms of the illumination system according to the present invention are classified into the three forms described below.

<First Product Form>

Figure 13A:
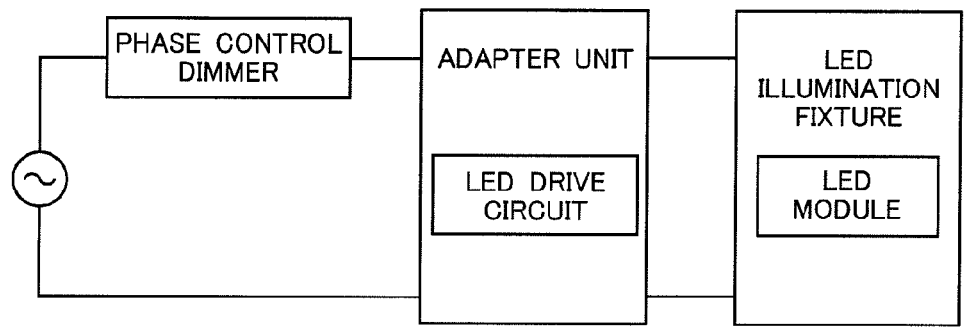
FIG. 13A is a view showing an overview of a first product type.

In a first product form, an adapter unit in which the LED drive circuit according to the present invention forms a unit is connected to a phase control dimmer, and an LED illumination fixture in which an LED module forms a unit is connected to the adapter unit, as shown in FIG. 13A.

<Second Product Form>

Figure 13B:
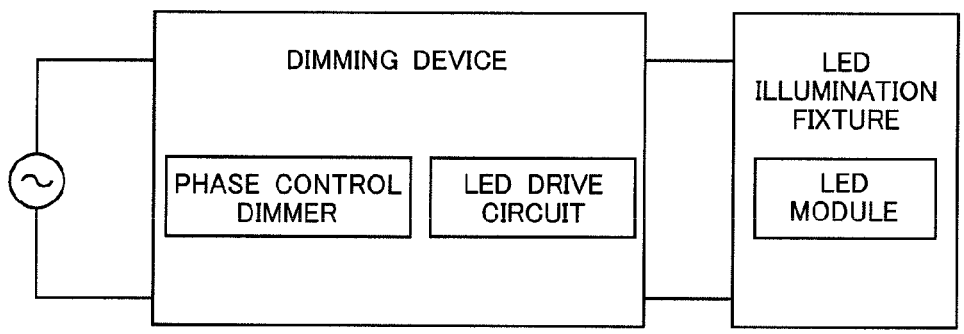
FIG. 13B is a view showing an overview of a second product type.

In a second product form, an LED illumination fixture which houses an LED module is connected to a dimming device (dimming device according to the present invention) in which a phase control dimmer and the LED drive circuit according to the present invention form a unit, as shown in FIG. 13B.

<Third Product Form>

Figure 13C:
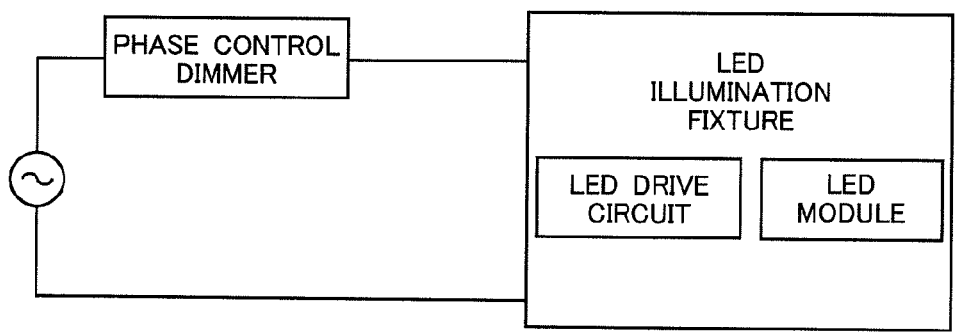
FIG. 13C is a view showing an overview of a third product type.

In a third product form, an LED illumination fixture (LED illumination fixture according to the present invention) in which the LED drive circuit according to the present invention and an LED module form a unit is connected to a phase control dimmer, as shown in FIG. 13C.

Figure 14:
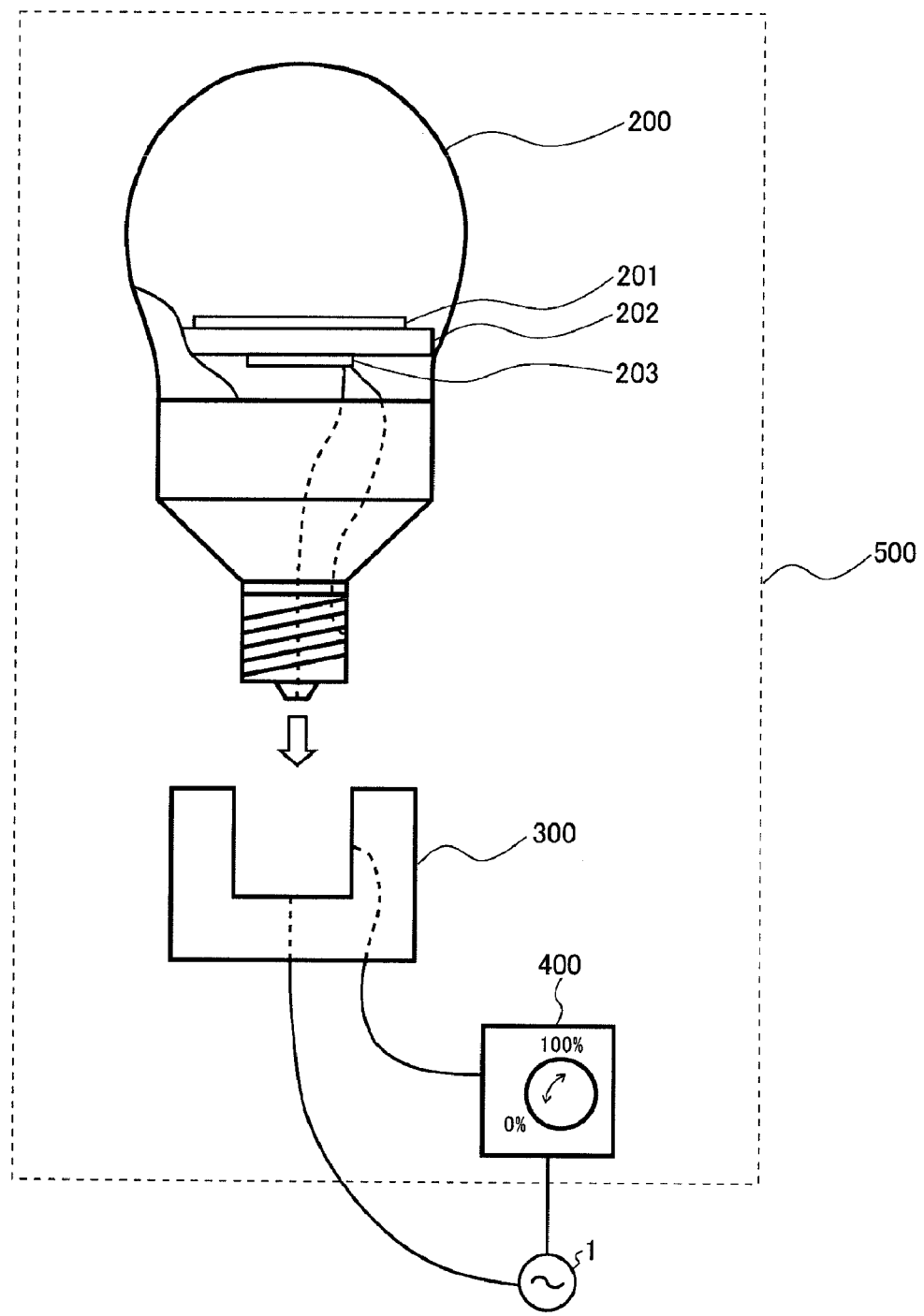
FIG. 14 is a view showing an example of the overall structure of the LED illumination fixture according to the present invention, the LED illumination device according to the present invention, and the LED illumination system according to the present invention.

FIG. 14 shows an example of the overall structure of the LED illumination fixture according to the present invention, the LED illumination device according to the present invention, and the LED illumination system according to the present invention in the third product form. FIG. 14 shows a partial cut-away view of the compact self-ballasted LED illumination fixture 200 of the present invention. A housing or substrate 202, an LED module 201 composed of one or more LEDs provided to the front surface (facing the top of the bulb) of the housing or substrate 202, and a circuit 203 provided to the back surface (facing the bottom of the bulb) of the housing or substrate 202 are provided inside the compact self-ballasted LED illumination fixture 200 of the present invention. The examples of the LED drive circuit of the present invention described above, for example, may be used in the circuit 203.

An LED illumination fixture mount 300 into which the compact self-ballasted LED illumination fixture 200 of the present invention is screwed, and a light controller (phase control dimmer) 400 are connected in series to the alternating-current power supply 1. The compact self-ballasted LED illumination fixture 200 of the present invention and the LED illumination fixture mount 300 constitute an LED illumination device (ceiling light, pendant light, kitchen light, recessed light, floor lamp, spotlight, foot light, or the like). The LED illumination system 500 of the present invention is formed by the compact self-ballasted LED illumination fixture 200 of the present invention, the LED illumination fixture mount 300, and the light controller 400. The LED illumination fixture mount 300 is disposed on an interior ceiling wall surface, for example, and the light controller 400 is disposed on an interior side wall surface, for example.

Since the compact self-ballasted LED illumination fixture 200 of the present invention can be attached to and detached from the LED illumination fixture mount 300, flickering and extinguishing of the LED during low-luminance dimming can be reduced merely by replacing the incandescent bulb, fluorescent lamp, or other illumination fixture with the compact self-ballasted LED illumination fixture 200 of the present invention in an existing illumination device and illumination system in which a conventional incandescent bulb, fluorescent lamp, or the like was used.

Figure 18:
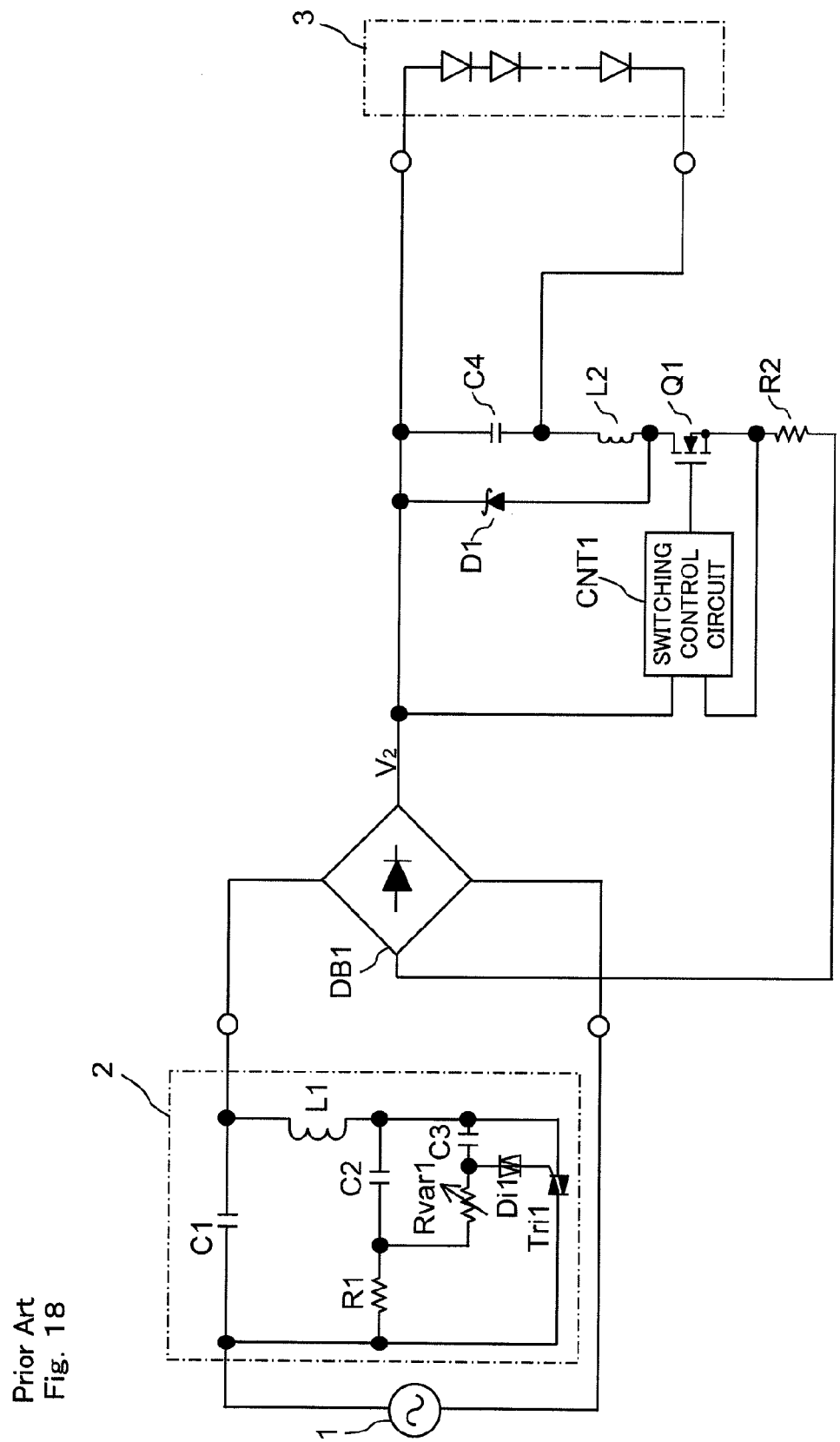
FIG. 18 is a view showing an example of a conventional LED illumination system.
Figure 19A:
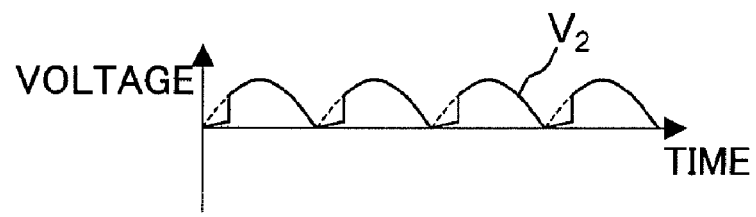
FIG. 19A is a view showing an example of the waveform of the voltage that occurs at the positive output terminal of the diode bridge in the LED illumination system shown in FIG. 18 in a case in which the bright dimmer level is set.
Figure 19B:
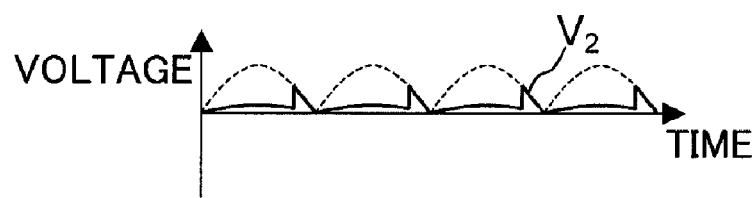
FIG. 19B is a view showing an example of the waveform of the voltage that occurs at the positive output terminal of the diode bridge in the LED illumination system shown in FIG. 18 in a case in which the dark dimmer level is set.
Figure 20:
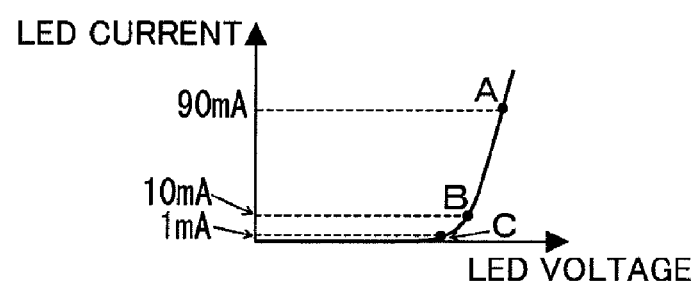
FIG. 20 is a view showing the voltage-current characteristic of the LED module.

FIG. 14 shows the appearance of the light controller 400 in a case in which the light controller 400 is the phase control dimmer shown in FIG. 18, and the light controller 400 is configured so that the degree of dimming can be varied by using a volume knob. A configuration may also be adopted in which the degree of dimming can be varied by using a volume slider instead of a knob.

The light controller 400 is described above as being directly operable by a person by using a volume knob or volume slider, but this configuration is not limiting, and a person may also remotely operate the light controller 400 by using a remote control or other wireless signal. In other words, remote operation is possible by providing a wireless signal receiver to the body of the light controller as the receiving side, and providing a transmitter body (e.g., a remote control transmitter, a mobile terminal, or the like) as the transmitting side with a wireless signal transmission unit for transmitting light control signals (e.g., a dimmer signal, a light on/off signal, and other signals) to the wireless signal receiver.

Figure 15:
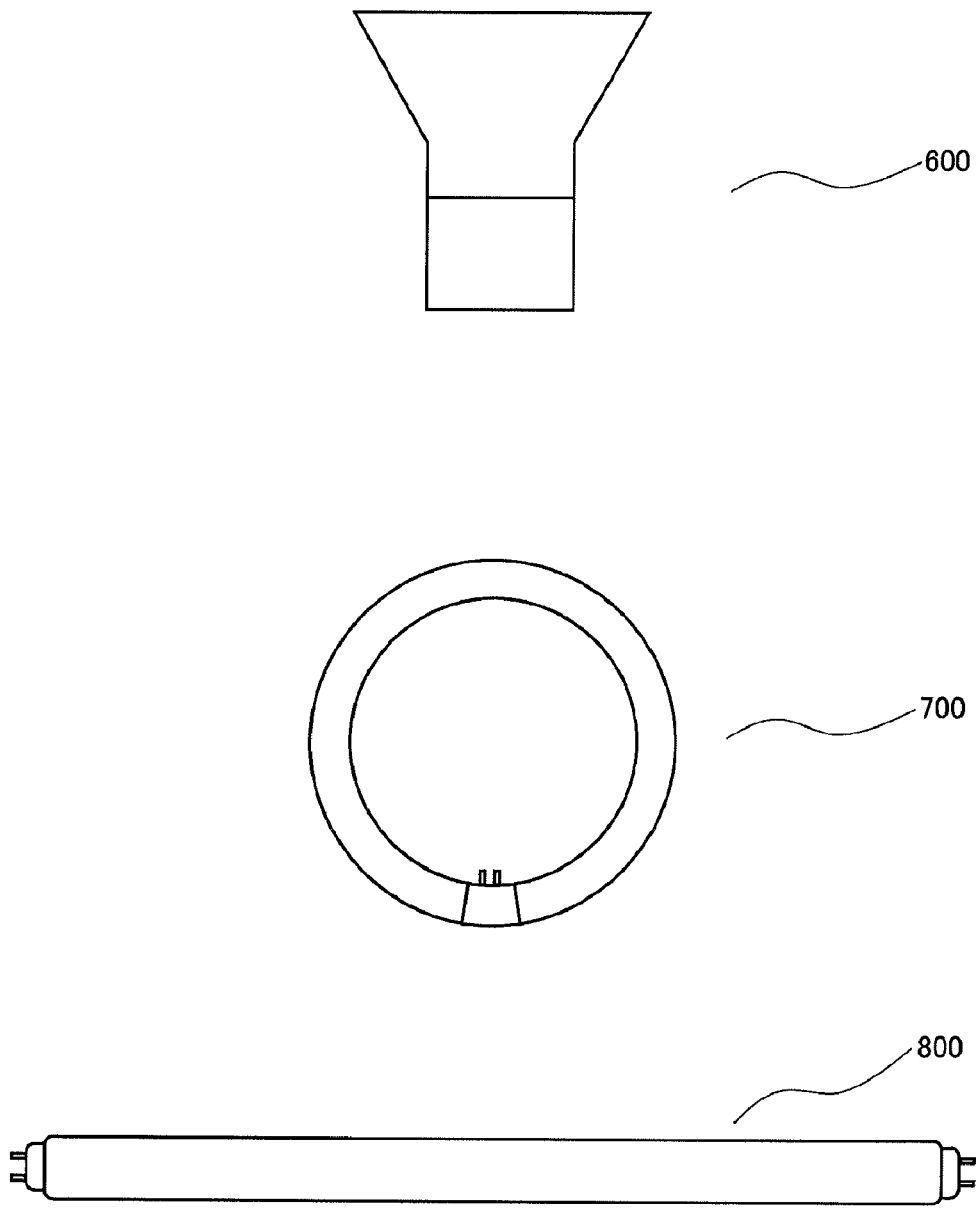
FIG. 15 is a view showing another example of the overall structure of the LED illumination fixture according to the present invention.
Figure 16:
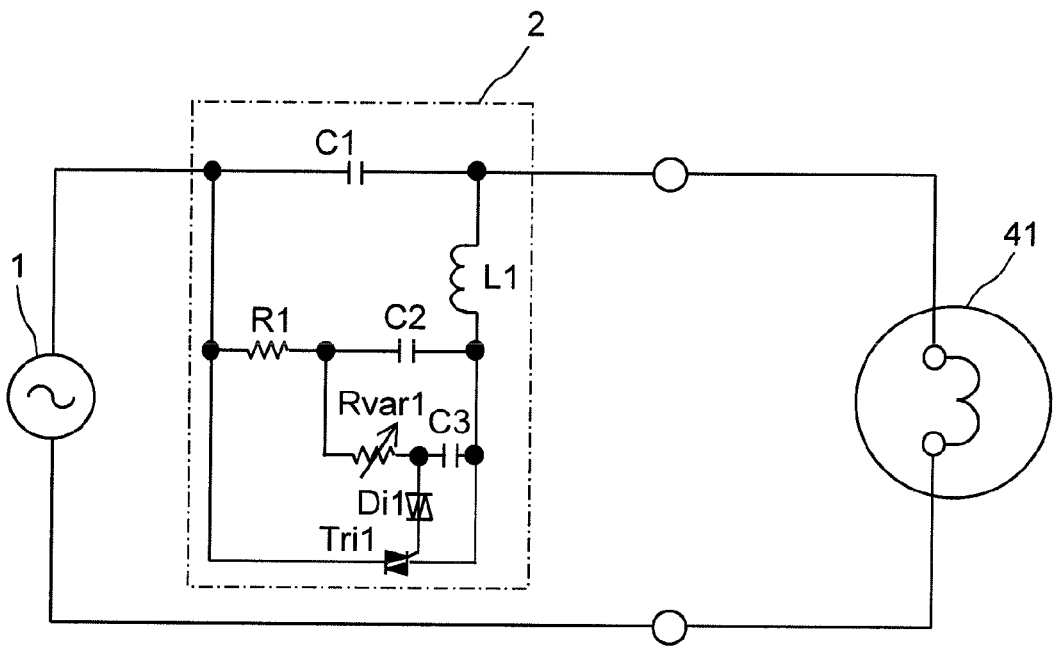
FIG. 16 is a view showing an example of the configuration of an incandescent bulb illumination system.
Figure 17:
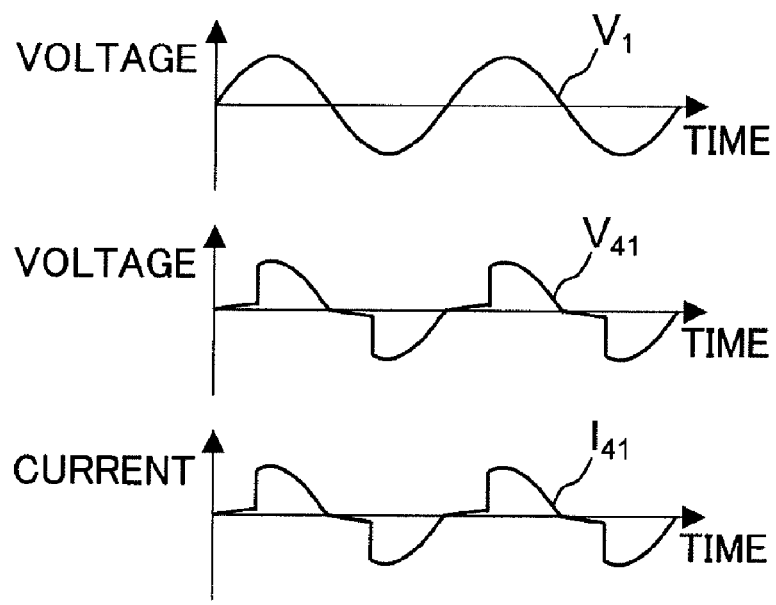
FIG. 17 is a view showing an example of the voltage/current waveform of each component of the incandescent bulb illumination system shown in FIG. 16.

The LED illumination fixture of the present invention is not limited to a compact self-ballasted LED illumination fixture, and may be the lamp-type LED illumination fixture 600, the ring-type LED illumination fixture 700, or the straight tube-type LED illumination fixture 800 shown in FIG. 15.

What is claimed is:

1. An LED drive circuit in which an alternating voltage from a phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

2. The LED drive circuit according to claim 1, wherein:
a current detector is provided for detecting the current flowing to said LED; and
said controller controls said switching power supply and said switching element in accordance with the output of said phase angle detector and the output of said current detector.

3. The LED drive circuit according to claim 1, wherein said controller limits the minimum value of the on-duty of said switching power supply when said switching element is in the on state.

4. The LED drive circuit according to claim 1, wherein said controller places said switching element in the off state when the current flowing to said LED is below a certain constant value.

5. The LED drive circuit according to claim 4, wherein said controller places said switching element in the on state in accordance with the period of said alternating voltage.

6. The LED drive circuit according to claim 1, wherein said controller places said switching element in the always-off state and stops lighting of said LED when the phase angle detected by said phase angle detector is greater than a certain constant value.

7. The LED drive circuit according to claim 1, wherein said controller controls the peak value of the current flowing to a switching element inside said switching power supply in accordance with the input voltage of said switching power supply.

8. The LED drive circuit according to claim 1, wherein said controller stops operation of said switching power supply when the input voltage of said switching power supply is below a certain constant value.

9. The LED drive circuit according to claim 1, wherein said switching power supply is a step-up switching power supply circuit.

10. The LED drive circuit according to claim 9; wherein said controller has
a first drive circuit for controlling the on/off switching of the switching element inside said switching power supply;
a second drive circuit for performing analog control of a voltage fed to a control terminal of the switching element inside said switching power supply so as to make constant the value of the current flowing to the switching element inside said switching power supply; and
a selector for selecting any one of driving of said switching power supply by said first drive circuit, and driving of said switching power supply by said second drive circuit, in accordance with the input voltage of said switching power supply, the input current of said LED drive circuit, or the current flowing to said LED.

11. The LED drive circuit according to claim 10, wherein it is possible to switch the value of the current flowing to the switching element inside said switching power supply which is made constant by the control of said second drive circuit.

12. The LED drive circuit according to claim 10, wherein operation of said second drive circuit is stopped when said selector selects driving of said switching power supply by said first drive circuit.

13. The LED drive circuit according to claim 1, wherein said switching power supply is a step-down switching power supply circuit.

14. The LED drive circuit according to claim 1, wherein said switching power supply is a switching power supply circuit having a transformer.

15. An LED illumination fixture comprising:
an LED drive circuit; and
an LED connected to the output side of said LED drive circuit;
wherein
said LED drive circuit is an LED drive circuit in which an alternating voltage from a phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

16. An LED illumination device comprising:
an LED drive circuit;
wherein
said LED drive circuit is an LED drive circuit in which an alternating voltage from a phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

17. An LED illumination device comprising:
an LED illumination fixture;
wherein
said LED illumination fixture is an LED illumination fixture comprising:
an LED drive circuit; and
an LED connected to the output side of said LED drive circuit;
wherein
said LED drive circuit is an LED drive circuit in which an alternating voltage from a phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

18. An LED illumination system comprising:
an LED illumination fixture; and
a phase control dimmer connected to the input side of said LED illumination fixture;
wherein
said LED illumination fixture is an LED illumination fixture comprising:
an LED drive circuit; and
an LED connected to the output side of said LED drive circuit;
wherein
said LED drive circuit is an LED drive circuit in which an alternating voltage from said phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

19. An LED illumination system comprising:
an LED illumination device; and
a phase control dimmer connected to the input side of said LED illumination device;
wherein
said LED illumination device is an LED illumination device comprising:
an LED drive circuit;
wherein
said LED drive circuit is an LED drive circuit in which an alternating voltage from said phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

20. An LED illumination system comprising:
an LED illumination device; and
a phase control dimmer connected to the input side of said LED illumination device;
wherein
said LED illumination device is an LED illumination device comprising:
an LED illumination fixture;
wherein
said LED illumination fixture is an LED illumination fixture comprising:
an LED drive circuit; and
an LED connected to the output side of said LED drive circuit;
wherein
said LED drive circuit is an LED drive circuit in which an alternating voltage from said phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

21. A dimming device comprising:
an LED drive circuit; and
a phase control dimmer for feeding an alternating voltage to said LED drive circuit;
wherein
said LED drive circuit is an LED drive circuit in which an alternating voltage from said phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

22. An LED illumination system comprising:
an LED illumination fixture; and
a dimming device connected to the input side of said LED illumination fixture;
wherein
said dimming device is a dimming device comprising:
an LED drive circuit; and
a phase control dimmer for feeding an alternating voltage to said LED drive circuit;
wherein
said LED drive circuit is an LED drive circuit in which an alternating voltage from said phase control dimmer is input and an LED is driven; the LED drive circuit comprising:
a phase angle detector for detecting the phase angle at which a phase control element inside said phase control dimmer switches from off to on;
a switching power supply for feeding a current to said LED;
a switching element connected in series to said LED; and
a controller for controlling said switching power supply and said switching element in accordance with the output of said phase angle detector; wherein
said controller places said switching element in an always-on state in a case in which the phase angle detected by said phase angle detector is equal to or less than a predetermined value, and said controller pulse-drives said switching element in a case in which the phase angle detected by said phase angle detector is greater than said predetermined value.

* * * * *